United States Patent [19]

Tanabe et al.

[11] Patent Number: 5,264,272
[45] Date of Patent: Nov. 23, 1993

[54] RESISTOR PASTE AND CERAMIC SUBSTRATE

[75] Inventors: Ryuichi Tanabe, Yokohama; Yoshiyuki Nishihara, Kawasaki, both of Japan

[73] Assignee: Asahi Glass Company Ltd., Tokyo, Japan

[21] Appl. No.: 984,471

[22] Filed: Dec. 2, 1992

Related U.S. Application Data

[60] Division of Ser. No. 899,156, Jun. 15, 1992, Pat. No. 5,202,292, which is a continuation of Ser. No. 531,750, Jun. 1, 1990, abandoned.

[30] Foreign Application Priority Data

Jun. 9, 1989 [JP] Japan .................. 1-145486
Jul. 14, 1989 [JP] Japan .................. 1-180565

[51] Int. Cl.⁵ .................................. B05D 1/00
[52] U.S. Cl. .......................... 428/209; 428/901; 428/210; 501/66; 501/67; 501/77
[58] Field of Search ............ 428/325, 689, 697, 699; 501/65, 66, 67, 72, 77, 78

[56] References Cited

U.S. PATENT DOCUMENTS

| | | | |
|---|---|---|---|
| 4,215,020 | 7/1980 | Wahlers et al. | 428/432 |
| 4,378,409 | 3/1983 | Kuo | 428/432 |
| 4,379,195 | 4/1983 | Prabhu et al. | 428/432 X |
| 4,397,915 | 8/1983 | Wahlers et al. | 428/432 X |
| 4,698,265 | 10/1987 | Wahlers et al. | 428/432 |

OTHER PUBLICATIONS

Hacks Chemical Dictionary 1987 p. 261.

*Primary Examiner*—Karl Group
*Assistant Examiner*—Chris Gallo
*Attorney, Agent, or Firm*—Oblon, Spivak, McClelland, Maier & Neustadt

[57] ABSTRACT

A resistor paste comprising an inorganic component which consists essentially of from 20 to 70 wt % of glass powder and from 30 to 80 wt % of a powder selected from the group consisting of $SnO_2$ power, Sb-doped $SnO_2$ powder and a mixture thereof, wherein the glass powder consists essentially of from 12 to 50 wt % of $SiO_2$, from 0 to 20 wt % of $Al_2O_3$, from 0 to 40 wt % of $MgO$, from 0 to 40 wt % of $CaO$, from 0 to 60 wt % of $SrO$, from 16 to 60 wt % of $MgO+CaO+SrO$, from 0 to 10 wt % of $Li_2O+Na_2O+K_2O+Cs_2O$, from 0 to 10 wt % of $PbO$, from 0 to 20 wt % of $ZnO$, from 0 to 10 wt % of $ZrO_2+TiO_2$, from 8 to 40 wt % of $B_2O_3$, from 0 to 60 wt % of $Ta_2O_5$, from 0 to 50 wt % of $Nb_2O_5$, from 0 to 60 wt % of $Ta_2O_5+Nb_2O_5$, and from 0.1 to 20 wt % of $Fe_2O_3+CuO+NiO+CoO+MnO+MoO_3+WO_3+Cr_2O_3+Bi_2O_3+CeO_2+Sb_2O_3+In_2O_3+SnO_2$.

4 Claims, 3 Drawing Sheets

RESISTOR PASTE AND CERAMIC SUBSTRATE

This is a division of application Ser. No. 07/899,156, filed on Jun. 15, 1992, now U.S. Pat. No. 5,202,292, which is a continuation of Ser. No. 07/531,750, filed on Jun. 1, 1990, now abandoned.

BACKGROUND OF THE INVENTION

1. Field of the Invention

The present invention relates to a resistor paste composition and a ceramic substrate. More particularly, it relates to a resistor paste comprising $SiO_2$-$B_2O_3$ system glass containing metal oxides, and $SnO_2$ and/or Sb-doped $SnO_2$, which is useful for a ceramic substrate, whereby even when fired in a non-oxidizing atmosphere, it will not be reduced, and provides adequate stability of e.g. resistivity.

2. Discussion of Background

Heretofore, the resistor in a hybrid integrated circuit has been formed in such a manner that a silver (Ag) or Ag-palladium (Pd) conductor is formed on or in a ceramic substrate, and a resistor paste is printed between the conductor patterns, followed by firing in an oxidizing atmosphere such as air at a temperature of from about 850° to 900° C. The resistor paste used in such a case used to be composed mainly of $RuO_2$ and glass. However, recently, it has been common to employ a copper (Cu) conductor instead of the Ag or Ag-Pd conductor, from the viewpoint of the reliability in e.g. migration.

However, the Cu conductor is oxidized unless it is fired in a non-oxidizing atmosphere such as nitrogen. In a non-oxidizing atmosphere, $RuO_2$ can not be used, since it will be reduced and will not form a resistor in such a non-oxidizing atmosphere.

Therefore, it has recently been proposed to employ a combination of antimony (Sb)-doped tin oxide and glass powder (Japanese Unexamined Patent Publication No. 119902/1987). However, such a combination still has a drawback that the resistivity and the temperature coefficient of resistivity (TCR) are not yet adequately stable.

SUMMARY OF THE INVENTION

It is an object of the present invention to provide a novel resistor paste and ceramic substrate, which can be fired in a non-oxidizing atmosphere such as nitrogen and which are able to provide a constant resistivity and temperature coefficient of resistivity (TCR).

The present invention has been made to solve the above-mentioned problems and provides a resistor paste comprising an inorganic component which consists essentially of from 20 to 70 wt % of glass powder and from 30 to 80 wt % of a powder selected from the group consisting of $SnO_2$ power, Sb-doped $SnO_2$ powder and a mixture thereof, wherein the glass powder consists essentially of from 12 to 50 wt % of $SiO_2$, from 0 to 20 wt % of $Al_2O_3$, from 0 to 40 wt % of MgO, from 0 to 40 wt % of CaO, from 0 to 60 wt % of SrO, from 16 to 60 wt % of MgO+CaO+SrO, from 0 to 10 wt % of $Li_2O+Na_2O+K_2O+Cs_2O$, from 0 to 10 wt % of PbO, from 0 to 20 wt % of ZnO, from 0 to 10 wt % of $ZrO_2+TiO_2$, from 8 to 40 wt % of $B_2O_3$, from 0 to 60 wt % of $Ta_2O_5$, from 0 to 50 wt % of $Nb_2O_5$, from 0 to 60 wt % of $Ta_2O_5+Nb_2O_5$, and from 0.1 to 20 wt % of $Fe_2O_3+CuO+NiO+CoO+MnO+MoO_3+WO_3+Cr_2O_3+Bi_2O_3+CeO_2+Sb_2O_3+In_2O_3+SnO_2$.

The present invention also provides a ceramic substrate having such a resistor paste fired thereon.

DETAILED DESCRIPTION OF THE PREFERRED EMBODIMENTS

Now, the present invention will be described in detail.

The resistor paste of the present invention is suitable for use for a single layer or multi-layer ceramic substrate, and is useful in such a manner that it is formed by a method of e.g. printing, on a ceramic substrate such as a fired and solidified alumina substrate, or on a green sheet for a ceramic substrate, followed by firing in a non-oxidizing atmosphere such as a nitrogen atmosphere. In this specification, "%" means "wt %" unless otherwise specified.

In the resistor paste of the present invention, the inorganic component consists essentially of from 20 to 70% of glass powder and from 30 to 80% of a powder of conductive material. These materials will be described below.

The glass powder is preferably a sinterable $SiO_2$-$B_2O_3$ system glass which has adequate fluidity at a low temperature (e.g. at a temperature of not higher than 900° C.) and which is capable of covering and sufficiently wetting the above powder of conductive material at the time of firing.

If the content of such glass powder is less than 20%, the powder of conductive material can not adequately be wetted, whereby the sintered layer will have void pores, and strength of the resistor formed by firing the resistor paste of the present invention will be low, and the stability of the resistivity will be low. On the other hand, if it exceeds 70%, the adhesion among the powder particles of conductive material tends to be small, whereby the resistivity tends to be high.

The glass powder in the present invention is preferably within a range of from 25 to 65% within the above range.

On the other hand, as the powder of conductive material, commercially available $SnO_2$ or $SnO_2$ having Sb doped usually in the form of an oxide of $Sb_2O_3$, may be used alone or in combination, because such material has high conductivity i.e. low resistivity, so that the resistivity of the resistor of the present invention which is a composite of the conductive material and the glass, can be adjusted to a desired level.

Sb-doped $SnO_2$ has a low resistivity as compared with non-doped $SnO_2$. The resistivity increases if the doping amount increases to excess. When the resistance according to the present invention is not higher than 10 M$\Omega$, the doping amount is suitably within a range of from 0 to 20%, preferably from 0.1 to 15%, more preferably from 1 to 10%, as calculated as an oxide of $Sb_2O_3$. When the resistance according to the present invention is higher than 10 MΩ, the doping amount may be 20% or higher as calculated as an oxide of $Sb_2O_3$.

With respect to the particle size of the glass powder according to the present invention, if the particle size is too small, the above resistivity tends to be too high, and if it is too large, it becomes difficult to adequately wet the glass, and void pores tend to increase in the sintered layer, such being undesirable. The average particle size should usually be within a range of from 0.5 to 6 μm, preferably from 1 to 5 μm.

On the other hand, if the particle size of the powder of conductive material according to the present invention, is too small, the resistivity tends to be too large, and if it is too large, the distribution on the ceramic substrate tends to be non-uniform, and the variation in the resistivity will be large, such being undesirable. The average particle size should usually be within a range of from 0.01 to 5 μm, preferably from 0.05 to 3 μm.

In the present invention, the glass powder consists essentially of:

| | |
|---|---|
| $SiO_2$ | 12–50% |
| $Al_2O_3$ | 0–20% |
| MgO+CaO+SrO | 16–60% |
| (MgO, 0–40%, CaO 0–40%, SrO 0–60%) | |
| $Li_2O+Na_2O+K_2O+Cs_2O$ | 0–10% |
| PbO | 0–10% |
| ZnO | 0–20% |
| $ZrO_2+TiO_2$ | 0–10% |
| $B_2O_3$ | 8–40% |
| $Ta_2O_5$ | 0–60% |
| $Nb_2O_5$ | 0–50% |
| $Ta_2O_5+Nb_2O_5$ | 0–60% |
| Metal oxides | 0.1–20% |

These components will be described below.

In such a composition, $SiO_2$ is a network former of the glass, and if it is less than 12%, the softening point will be too low, whereby the heat resistance will be low, and the glass will easily be deformed when it is fired again, such being undesirable. On the other hand, if $SiO_2$ exceeds 50%, the softening point tends to be too high, whereby the fluidity of glass tends to be poor at the time of firing, and it tends to be incapable of covering and wetting the powder of conductive material. Further, void pores in the sintered layer tend to be too many, and the stability of the resistance will be poor. It is preferably within a range of from 15 to 45%.

$Al_2O_3$ is not essential, but when incorporated, it contributes to the improvement of moisture resistance. If it exceeds 20%, the softening temperature of glass will be high, and the sinterability tends to be poor. It is preferably not higher than 18%.

MgO+CaO+SrO improve the solubility at the time of the preparation of the glass powder and thus have a function to adjust the thermal expansion coefficient. If their content is less than 16%, the above solubility will not adequately be improved, and devitrification is likely to result during the preparation of glass. On the other hand, if it exceeds 60%, the thermal expansion coefficient will be large, such being undesirable. Preferably, it is within a range of from 18 to 55%.

Further, in the above MgO+CaO+SrO, if either MgO or CaO is 40% or higher, the thermal expansion coefficient tends to be too large. Preferably, it is within a range of from 0 to 35%. In the above MgO+CaO+SrO, if SrO is 60% or higher, the thermal expansion coefficient tends to be too large. Preferably, it is within a range of from 0 to 55%.

$Li_2O+Na_2O+K_2O+Cs_2O$ are not essential, but they are effective for the improvement of the solubility of glass and also have a function to increase the resistivity. If their content exceeds 10%, the thermal expansion coefficient tends to be too large, the matching with the substrate will be poor, and the possibility of cracking in a thick film after firing increases. Preferably, it is not more than 8%.

PbO is not essential, but it is effective as a flux component for glass and has a function to increase the resistivity. If it exceeds 10%, the resistivity tends to be unstable. Preferably, it is not more than 5%.

ZnO is not essential, but may be incorporated up to 20% in order to improve the solubility of glass. Preferably, it is not more than 15%.

$ZrO_2+TiO_2$ are not essential. However, when they are incorporated, the moisture resistance of the resistor may be improved. It may be added up to 10%, preferably not more than 7%.

$B_2O_3$ is used as a flux component. If it is less than 8%, the softening point will be high, the sintering tends to be inadequate, and void pores in the sintered layer tend to be too many. On the other hand, if it exceeds 40%, the water resistance of glass will be low. Preferably, it is within a range of from 10 to 38%.

$Ta_2O_5$ and $Nb_2O_5$ are not essential components, but they are useful for adjusting the resistivity and the temperature coefficient of resistivity (TCR). By the incorporation of $Ta_2O_5$ and $Nb_2O_5$, it is possible to shift the resistivity to a higher direction and to shift TCR to the positive direction. Their amounts are determined to meet the desired resistivity. However, if $Ta_2O_5$ exceeds 60%, or $Nb_2O_5$ exceeds 50%, when manufacturing glass vitrification tends to be difficult.

Figure 1:
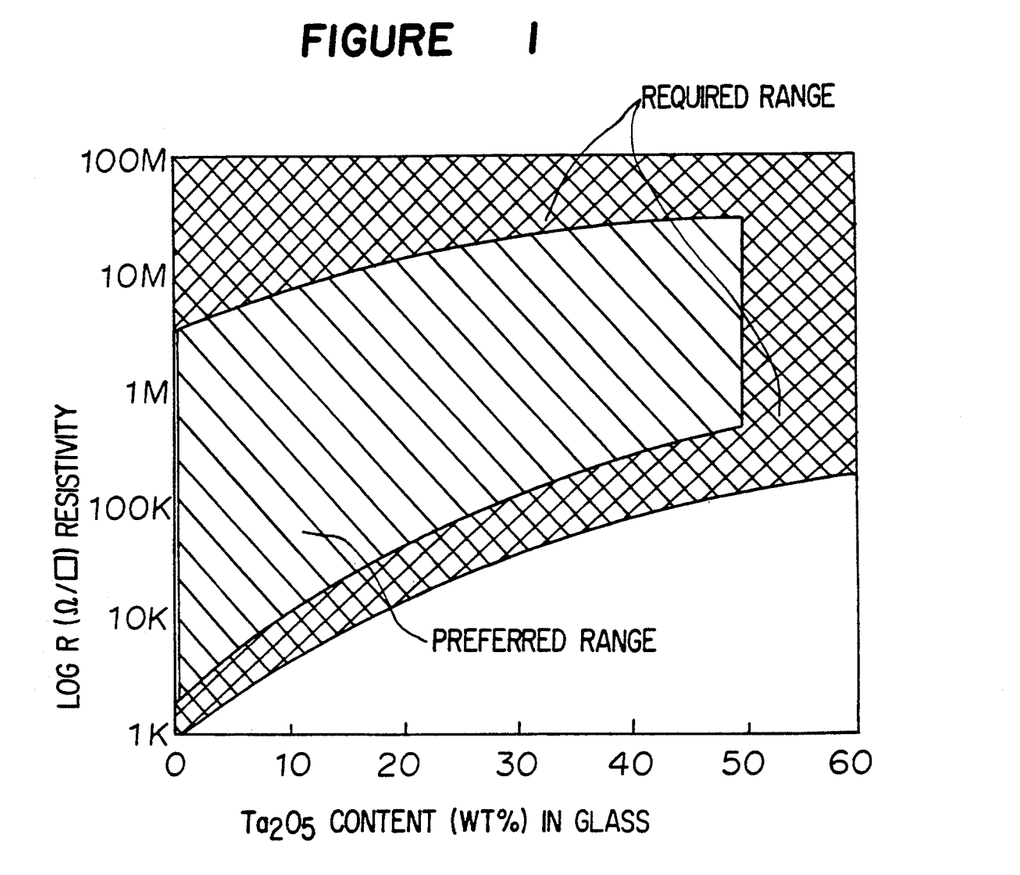
FIG. 1 is a graph showing the required range and the preferred range of the amount of $Ta_2O_5$ relative to the resistivity in the case where $Ta_2O_5$ is used alone ($Nb_2O_5<0.1$ wt %).
Figure 2:
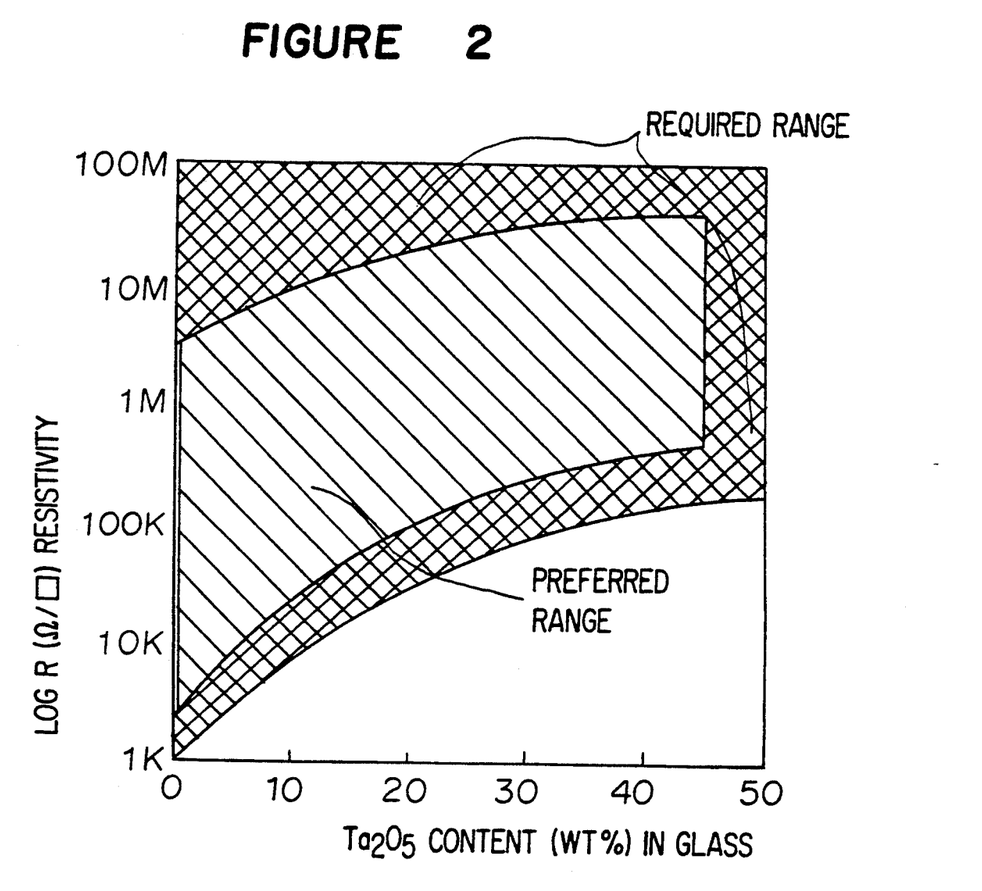
FIG. 2 is a graph showing the required range and the preferred range of the amount of $Nb_2O_5$ relative to the resistivity in the case where $Nb_2O_5$ is used alone ($Ta_2O_5 0.1$ wt %).
Figure 3:
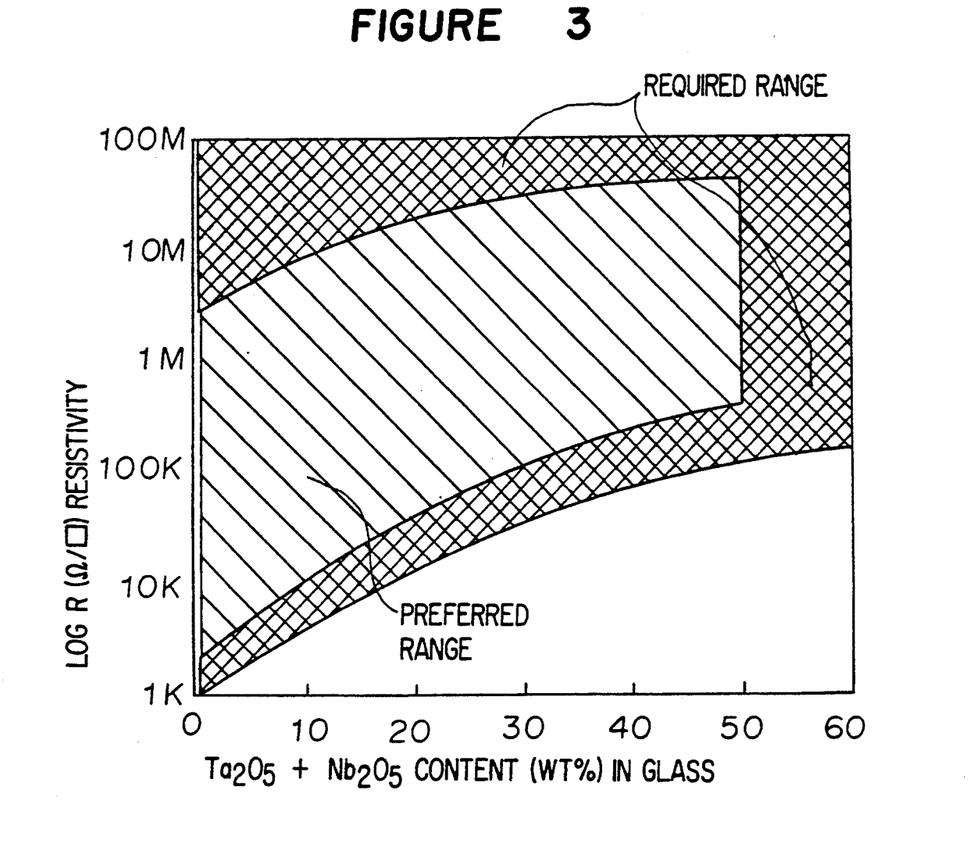
FIG. 3 is a graph showing the required range and the preferred range of the amount of $Ta_2O_5+Nb_2O_5$ relative to the resistivity.

The required ranges and the preferred ranges of $Ta_2O_5$, $Nb_2O_5$ and $Ta_2O_5+Nb_2O_5$ are shown in FIGS. 1, 2 and 3, respectively. The main points of these FIGS. 1 to 3 will be summarized as follows.

FIG. 1 is a graph showing the required range and the preferred range of the amount of $Ta_2O_5$ relative to the resistivity in a case where $Ta_2O_5$ is used alone ($Nb_2O_5 < 0.1$ wt %).

FIG. 2 is a graph showing the required range and the preferred range of the amount of $Nb_2O_5$ relative to the resistivity in a case where $Nb_2O_5$ is used alone ($Ta_2O_5 < 0.1$ wt %).

FIG. 3 is a graph showing the required range and the preferred range of the amount of $Ta_2O_5+Nb_2O_5$ relative to the resistivity.

Here, the combined use means that each of $Ta_2O_5$ and $Nb_2O_5$ is at least 0.1%. Namely, if one of them is less than 0.1%, the other is regarded as a single use.

| Respective ranges of $Ta_2O_5$ and $Nb_2O_5$ for desired levels of resistivity (Either $Ta_2O_5$ or $Nb_2O_5$ is used alone) | | | | |
|---|---|---|---|---|
| | $Ta_2O_5$ (wt %) $Nb_2O_5 < 0.1$ wt % | | $Nb_2O_5$ (wt %) $Ta_2O_5 < 0.1$ wt % | |
| Resistivity (Ω/□) | Required range | Preferred range | Required range | Preferred range |
| 10K | 0–18 | 0.5–9 | 0–12 | 0.5–6 |
| 100K | 0–46 | 0.5–30 | 0–34 | 0.5–20 |
| 1M | 0–60 | 0.5–50 | 0–50 | 0.5–45 |
| 10M | 0–60 | 15–50 | 0–50 | 10–45 |
| 100M | 0–60 | — | 0–50 | — |

| Respective ranges of $Ta_2O_5$ and $Nb_2O_5$ for desired levels of resistivity ($Ta_2O_5$ and $Nb_2O_5$ are used in combination) | | |
| --- | --- | --- |
| Resistivity | $Ta_2O_5$ + $Nb_2O_5$ (wt %) | |
| ($\Omega/\square$) | Required range | Preferred range |
| 10K | 0.2–18 | 0.5–9 |
| 100K | 0.2–46 | 0.5–30 |
| 1M | 0.2–60 | 0.5–50 |
| 10M | 0.2–60 | 10–50 |
| 100M | 0.2–60 | — |

As the above metal oxides, $Fe_2O_3$, CuO, NiO, MnO, $MoO_3$, $WO_3$, $Bi_2O_3$, $CeO_2$, CoO, $Cr_2O_3$, $Sb_2O_3$, $In_2O_3$ and $SnO_2$, may be used alone or in combination. These metal oxides have a function to adjust the resistivity and the temperature coefficient of resistivity (TCR) and to improve the laser trimming properties. Preferred among these metal oxides are NiO, MnO and $Sb_2O_3$. Particularly preferred is NiO. The respective functions will be listed below.

$Fe_2O_3$, CuO, NiO, MnO, CoO, $Cr_2O_3$, $SnO_2$, $Sb_2O_3$ and $WO_3$ are effective to lower the resistivity and shift TCR to the positive direction.

$MoO_3$ is effective to lower the resistivity and shift TCR to the negative direction.

$CeO_2$ is effective to increase the resistivity and shift TCR to the positive direction.

$Bi_2O_3$ is effective to increase the resistivity and shift TCR to the negative direction.

$In_2O_3$ is effective to increase the resistivity and shift TCR to the negative direction.

Further, they are effective to improve the cutting properties for the laser trimming to adjust the resistivity.

The respective amounts in the glass composition are determined to meet the desired resistance, temperature coefficient of resistivity (TCR) and laser trimming properties. However, if the total amount of the above metal oxides is less than 0.1%, no substantial effects will be obtained. On the other hand, if it exceeds 20%, the resistivity drift in the high temperature storage test will be large, such being undesirable. Preferably, the total amount is within a range of from 1 to 15%.

Among the above metal oxides, NiO, MnO and $Sb_2O_3$ are excellent in the effects for adjusting the resistivity and TCR and for stabilizing the resistivity drift. Among them, NiO is most excellent.

The preferred ranges with their resistivity being not more than 1M are as follows:

| | |
| --- | --- |
| $SiO_2$ | 15–45% |
| $Al_2O_3$ | 0–18% |
| MgO + CaO + SrO | 18–55% |
| (MgO, 0–35%, CaO 0–35%, SrO 0–55%) | |
| $Li_2O + Na_2O + K_2O + Cs_2O$ | 0–8% |
| PbO | 0–5% |
| ZnO | 0–15% |
| $ZrO_2 + TiO_2$ | 0–7% |
| $B_2O_3$ | 10–38% |
| $Ta_2O_5$ | 0.5–50% |
| $Nb_2O_5$ | 0.5–45% |
| $Ta_2O_5 + Nb_2O_5$ | 0.5–50% |
| Metal oxides | 1–15% |

The resistor paste composition of the present invention is a mixture of the respective powders in the above proportions. Now, a process for producing the resistor paste of the present invention and a process for producing a thick film circuit using such a resistor paste, will be described.

An organic vehicle comprising an organic binder and a solvent, is added to the above resistor paste composition of the present invention, and the mixture is kneaded to obtain a paste. Such an organic binder includes ethyl cellulose, acrylic resins, ethylene-vinyl acetate copolymer resins and poly α-methylstyrene resins. Likewise, the solvent includes α-terpineol, butylcarbitol acetate, butylcarbitol, 2,2,4-trimethylpentanediol-1,3-monoisobutylate, and diethylene glycol di-n-butyl ether. Further, a surfactant may be added as a dispersing agent.

Then, to form a conductor on a ceramic substrate such as a fired and solidified alumina substrate or on a glass ceramic substrate, a conductive paste such a Cu paste containing Cu as the main component, is formed in a prescribed circuit pattern by a method such as printing, followed by drying and then by firing at a temperature of from 800° to 1,000° C. for from 5 to 30 minutes in a non-oxidizing atmosphere such as a nitrogen atmosphere having an oxygen concentration of not higher than about 20 ppm. The preferred ranges of this firing conditions are from 880° to 920° C. for from 7 to 15 minutes. Then, the resistor paste of the present invention is printed at the predetermined portions for resistor, followed by drying and then by firing at a temperature of from 800° to 1,000° C. for from 5 to 30 minutes in the above-mentioned nitrogen atmosphere. The preferred ranges of this firing conditions are from 880° to 920° C. for from 7 to 15 minutes.

In the case of firing a multi-layer ceramic substrate all at once, ceramic green sheets for a ceramic substrate, having the above Cu paste and the resistor paste of the present invention already printed, are hot-pressed and laminated, followed by firing all at once at a temperature of from 800° to 1,000° C. for from a few minutes to a few hours in a non-oxidizing atmosphere such as the above nitrogen atmosphere, to obtain a multi-layer substrate.

To the resistor paste of the present invention, a coloring pigment such as a metal oxide or heat resistant inorganic pigment, may be incorporated for coloring in an amount of from 0 to 5%.

Further, from 0 to 5% of a nitrate, arsenic oxide, a sulfate, a fluoride or chloride may be added as a refining agent or a melting accelerator at the time of preparing the glass.

EXAMPLES

Starting materials for the glass powder of the present invention were mixed in the proportions as identified in Table 1, as calculated as oxides, and the proportions of the metal oxides are shown in Table 2. Each mixture was put into a platinum crucible heated under stirring at a temperature of from 1,350° to 1,500° C. for from 2 to 3 hours. Then, the product was pulverized in water or formed into flakes, and further pulverized by a pulverizer to an average particle size of from 0.5 to 6 μm to obtain glass powder. Then, a powder of $SnO_2$ and/or $SnO_2$ having Sb doped in an amount of 5% as calculated as an oxide of $Sb_2O_3$, was adjusted to have an average particle size of from 0.01 to 5 μm. Then, such glass powder and powder of conductive material were mixed in the proportions as identified in Table 1 to obtain a composition of the resistor paste of the present invention.

Then, to such a resistor paste, an organic vehicle comprising ethyl cellulose as an organic binder and α-terpineol as a solvent, was added, and the mixture was kneaded to obtain a paste having a viscosity of $30 \times 10^4$ cps. Then, Cu was screen-printed as a conductor on a solidified alumina substrate in a prescribed circuit pattern, followed by drying and firing at 900° C. for 10 minutes in a nitrogen atmosphere having an oxygen concentration of not higher than 20 ppm.

Then, at the prescribed portions for resistance, the above-mentioned resistor paste was screen-printed by a 200 mesh screen, followed by drying and firing at 900° C. for 10 minutes in a nitrogen atmosphere having an oxygen concentration of not more than 20 ppm. The film thickness after the firing was about 15 μm.

Thus, a circuit was formed on the ceramic substrate. With respect to this circuit, the resistivity, the temperature coefficient of resistivity (TCR) and the resistivity drift after storage at a high temperature, were measured. The results are shown in Table 1. It is evident from Table 1 that the resistor pastes of the present invention are excellent in the resistance characteristics and have adequate properties to be used as resistor pastes for forming thick film circuits.

As Comparative Examples, similar evaluations were conducted with respect to those other than the resistor pastes of the present invention. These are shown in Table 3.

The respective properties were measured by the following methods.

1) Resistivity and temperature coefficient of resistivity (TCR)

The resistivity values ($R_{25}$, $R_{-55}$ and $R_{125}$) at 25° C., −55° C. and +125° C. were measured by an ohmmeter in a constant temperature tank, and the temperature coefficients of resistivity were calculated by the following formulas:

$$\text{Cold TCR} = \frac{R_{25} - R_{-55}}{R_{25} \times (25 - (-55))} \times 10^6 \text{ (ppm/°C.)}$$

$$\text{Hot TCR} = \frac{R_{125} - R_{25}}{R_{25} \times (125 - 25)} \times 10^6 \text{ (ppm/°C.)}$$

2) Resistivity drift after storage at a high temperature

The test sample was left to stand in a constant temperature tank of 150° C. for 100 hours, and the resistivity drift was calculated by the following formula:

$$\frac{R_{100h} - R_0}{R_0} \times 100 (\%)$$

In the above formula, $R_{100h}$ = the resistivity after 100 hours, and $R_0$ = the initial resistivity.

TABLE 1

| Sample No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Glass composition (%) | | | | | | | | | | | | | | | |
| SiO₂ | 20 | 30 | 45 | 30 | 20 | 25 | 15 | 14 | 12 | 35 | 50 | 30 | 22 | 23 | 12 |
| Al₂O₃ | 10 | 0 | 0 | 10 | 5 | 0 | 18 | 0 | 1 | 14 | 3 | 0 | 16 | 8 | 7 |
| MgO | 5 | 0 | 10 | 10 | 0 | 0 | 15 | 10 | 0.5 | 1 | 25 | 2 | 32 | 0 | 0 |
| CaO | 20 | 10 | 10 | 15 | 10 | 2 | 5 | 0 | 0.5 | 2 | 3 | 15 | 0 | 40 | 0 |
| SrO | 14 | 20 | 0 | 5 | 30 | 15 | 30 | 6 | 58 | 14 | 0 | 30 | 0 | 0 | 58 |
| Li₂O | 0 | 0 | 2 | 0 | 0 | 0 | 0 | 0 | 0.5 | 5 | 6 | 0 | 1 | 0 | 1 |
| Na₂O | 0 | 2 | 5 | 0 | 0 | 0 | 0 | 0 | 0.5 | 1 | 0 | 0 | 0 | 2 | 2 |
| K₂O | 0 | 1 | 2 | 0 | 0 | 0 | 0 | 0 | 0.5 | 3 | 0 | 0 | 0 | 0 | 5 |
| Cs₂O | 0 | 0 | 1 | 0 | 0 | 0 | 0 | 0 | 0.5 | 0 | 0 | 0 | 0 | 0 | 1 |
| PbO | 0 | 3 | 0 | 0 | 0 | 0 | 0 | 0 | 0.5 | 0 | 0 | 0 | 2 | 1 | 0 |
| ZnO | 5 | 0 | 0 | 15 | 0 | 0 | 0 | 0 | 1 | 0 | 0 | 0 | 1 | 2 | 3 |
| ZrO₂ | 0 | 1 | 0 | 0 | 0 | 3 | 0 | 1 | 0.5 | 0 | 0 | 0 | 2 | 1 | 1 |
| TiO₂ | 0 | 0 | 0 | 0 | 0 | 0 | 0 | 1 | 0.5 | 0 | 0 | 0 | 1 | 2 | 1 |
| B₂O₃ | 25 | 21.5 | 18 | 9.5 | 30 | 35 | 11.5 | 8 | 8 | 9 | 10 | 16 | 8 | 8 | 8 |
| Ta₂O₅ | 0 | 0 | 0 | 0 | 0.5 | 0 | 0 | 50 | 0.8 | 0.5 | 1.5 | 2 | 0 | 1 | 0.5 |
| Nb₂O₅ | 0 | 10 | 0 | 0 | 0.5 | 0 | 0 | 0 | 14.5 | 0.5 | 1 | 0 | 0 | 1 | 0 |
| Metal oxides Constitution | | | | | | | Presented in Table 2 | | | | | | | | |
| Glass powder | 40 | 50 | 55 | 40 | 25 | 48 | 70 | 45 | 38 | 45 | 47 | 38 | 45 | 52 | 35 |
| Conductive material | | | | | | | | | | | | | | | |
| SnO₂ | 60 | 50 | 0 | 60 | 75 | 52 | 20 | 55 | 62 | 0 | 53 | 62 | 55 | 48 | 65 |
| Sb-doped SnO₂ | 0 | 0 | 45 | 0 | 0 | 0 | 10 | 0 | 0 | 55 | 0 | 0 | 0 | 0 | 0 |
| Average particle size (μm) | | | | | | | | | | | | | | | |
| Glass powder | 2.0 | 3.0 | 1.0 | 2.0 | 5.0 | 0.6 | 1.0 | 1.5 | 2.2 | 6.0 | 3.0 | 2.6 | 3.2 | 3.0 | 2.7 |
| Powder of conductive material | 1.0 | 0.1 | 1.0 | 0.05 | 0.5 | 5.0 | 0.1 | 0.2 | 0.5 | 1.2 | 0.8 | 0.2 | 1.0 | 0.5 | 1.0 |
| Properties | | | | | | | | | | | | | | | |
| Resistivity (Ω/□) | 16K | 7M | 1.5M | 15K | 7K | 50K | 12M | 20M | 115K | 150K | 480K | 3K | 120K | 620K | 30K |
| Hot TCR (ppm/°C.) | +70 | +150 | +30 | −50 | +100 | +150 | −120 | +70 | +100 | +180 | −130 | −50 | −80 | −120 | −250 |
| Cold TCR (ppm/°C.) | +80 | +120 | +80 | −70 | +50 | +160 | −100 | +80 | +120 | +150 | −160 | −30 | −100 | −150 | −230 |
| Resistivity drift (%) | +0.2 | −0.8 | +0.5 | +0.2 | +0.5 | +0.2 | −0.05 | +0.8 | −0.7 | +1.0 | +0.8 | +0.2 | −0.8 | −0.7 | +1.0 |

TABLE 1-continued

| Sample No. | Examples | | | | | | | | | | | | | |
|---|---|---|---|---|---|---|---|---|---|---|---|---|---|---|
| | 16 | 17 | 18 | 19 | 20 | 21 | 22 | 23 | 24 | 25 | 26 | 27 | 28 | 29 |
| Glass composition (%) | | | | | | | | | | | | | | |
| $SiO_2$ | 15 | 15 | 20 | 17 | 12 | 15 | 17 | 17 | 20 | 12 | 15 | 12 | 15 | 12.5 |
| $Al_2O_3$ | 12 | 10 | 10 | 0 | 20 | 18 | 13 | 3 | 5 | 1.5 | 3 | 0 | 8 | 0.5 |
| MgO | 0 | 20 | 5 | 0 | 20 | 2 | 0 | 0 | 6 | 10 | 8 | 12 | 5 | 0 |
| CaO | 0 | 2 | 1 | 10 | 0 | 30 | 0 | 0 | 6 | 10 | 2 | 4 | 5 | 0 |
| SrO | 45 | 5 | 12 | 20 | 0 | 0 | 40 | 50 | 6 | 10 | 10 | 0 | 8 | 16 |
| $Li_2O$ | 0 | 0 | 10 | 0 | 8 | 0 | 0 | 0 | 1 | 2 | 0 | 0 | 0 | 0 |
| $Na_2O$ | 0 | 0 | 0 | 0 | 0 | 0 | 0 | 0 | 1 | 3 | 2 | 0 | 0.5 | 0 |
| $K_2O$ | 1 | 0 | 0 | 10 | 0 | 0 | 0 | 0 | 1 | 1 | 1 | 0 | 0.5 | 0 |
| $Cs_2O$ | 0 | 10 | 0 | 0 | 0 | 0 | 0 | 0 | 1 | 0 | 2 | 0 | 0 | 0 |
| PbO | 0 | 5 | 10 | 8 | 0 | 0 | 2 | 5 | 2 | 0 | 2 | 0 | 0 | 0 |
| ZnO | 2 | 0 | 0 | 10 | 2 | 0 | 0 | 5 | 20 | 5 | 5 | 1 | 1 | 0 |
| $ZrO_2$ | 1 | 5 | 2 | 4 | 8 | 10 | 0 | 0 | 2 | 0 | 1.5 | 0 | 0 | 0 |
| $TiO_2$ | 0 | 5 | 1 | 2 | 0 | 0 | 0 | 10 | 3 | 0 | 2.5 | 0 | 0 | 0 |
| $B_2O_3$ | 9 | 10 | 10 | 11 | 10 | 10 | 8 | 9.5 | 8 | 40 | 12 | 8 | 8 | 8 |
| $Ta_2O_5$ | 0 | 3 | 1 | 0 | 0 | 3 | 0 | 0 | 1 | 3 | 15 | 55 | 0 | 18 |
| $Nb_2O_5$ | 0 | 0 | 1.5 | 0 | 1 | 2 | 0 | 0 | 0 | 2 | 1 | 0 | 30 | 35 |
| Metal oxides Constitution | | | | | | Presented in Table 2 | | | | | | | | |
| Glass powder | 32 | 50 | 40 | 45 | 41 | 40 | 37 | 47 | 35 | 45 | 40 | 50 | 46 | 50 |
| Conductive material | | | | | | | | | | | | | | |
| $SnO_2$ | 68 | 50 | 60 | 55 | 59 | 60 | 63 | 53 | 0 | 55 | 60 | 50 | 54 | 50 |
| Sb-doped $SnO_2$ | 0 | 0 | 0 | 0 | 0 | 0 | 0 | 0 | 65 | 0 | 0 | 0 | 0 | 0 |
| Average particle size (μm) | | | | | | | | | | | | | | |
| Glass powder | 4.0 | 3.5 | 2.5 | 1.5 | 3.0 | 2.6 | 3.2 | 3.5 | 3.0 | 2.5 | 2.7 | 4.0 | 1.0 | 0.5 |
| Powder of conductive material | 0.5 | 0.8 | 1.5 | 2.0 | 1.0 | 0.1 | 0.8 | 0.01 | 0.1 | 1.0 | 2.5 | 1.4 | 1.5 | 5.0 |
| Properties | | | | | | | | | | | | | | |
| Resistivity ($\Omega/\square$) | 18K | 600K | 15K | 320K | 20K | 25K | 85K | 550K | 2.5K | 960K | 200K | 35M | 15M | 85M |
| Hot TCR (ppm/°C.) | −80 | −20 | +180 | −100 | +80 | +90 | −150 | −200 | −100 | −250 | −180 | −220 | −150 | −250 |
| Cold TCR (ppm/°C.) | −70 | −40 | +160 | −80 | +70 | +100 | −180 | −220 | −120 | −200 | −170 | −200 | −180 | −220 |
| Resistivity drift (%) | +0.6 | −0.5 | −0.8 | +0.7 | +1.0 | +0.6 | +0.8 | −0.8 | +1.0 | +1.0 | +0.6 | +0.8 | +0.8 | −0.7 |

| Sample No. | Examples | | | | | | | | | | | | | |
|---|---|---|---|---|---|---|---|---|---|---|---|---|---|---|
| | 30 | 31 | 32 | 33 | 34 | 35 | 36 | 37 | 38 | 39 | 40 | 41 | 42 | 43 | 44 |
| Glass composition (%) | | | | | | | | | | | | | | |
| $SiO_2$ | 30 | 20 | 50 | 32 | 30 | 20 | 30 | 23 | 20 | 20 | 23 | 21 | 22 | 28 | 30 |
| $Al_2O_3$ | 0 | 0 | 0 | 0 | 0 | 8 | 0 | 0 | 0 | 0 | 0 | 0 | 0 | 5 | 0 |
| MgO | 5 | 1 | 0 | 7 | 5 | 6 | 5 | 3 | 6 | 6 | 6 | 3 | 5 | 0 | 5 |
| CaO | 10 | 5 | 8 | 10 | 10 | 2 | 12 | 7 | 7 | 5 | 6 | 7 | 8 | 20 | 0 |
| SrO | 10 | 10 | 12 | 10 | 28 | 25 | 8 | 19 | 30 | 35 | 27 | 20 | 22 | 12 | 30 |
| $Li_2O$ | 0 | 0 | 0 | 0 | 0 | 0 | 0 | 0 | 0 | 0 | 0 | 0 | 0 | 0 | 0 |
| $Na_2O$ | 0 | 0 | 2 | 0 | 0 | 0 | 0 | 0 | 0 | 0 | 0 | 0 | 0 | 0 | 0 |
| $K_2O$ | 0 | 0 | 1 | 0 | 0 | 0 | 0 | 0 | 0 | 0 | 0 | 0 | 0 | 1 | 0 |
| $Cs_2O$ | 0 | 0 | 5 | 0 | 0 | 0 | 0 | 0 | 0 | 0 | 0 | 0 | 0 | 0 | 0 |
| PbO | 0 | 0 | 0 | 0 | 0 | 0 | 0 | 0 | 0 | 0 | 0 | 0 | 0 | 2 | 2 |
| ZnO | 0 | 0 | 1 | 0 | 0 | 0 | 0 | 0 | 0 | 0 | 0 | 0 | 0 | 5 | 0 |
| $ZrO_2$ | 0 | 0 | 1 | 0 | 0 | 0 | 0 | 0 | 0 | 0 | 0 | 0 | 0 | 1 | 0 |
| $TiO_2$ | 0 | 0 | 1 | 0 | 0 | 0 | 0 | 0 | 0 | 0 | 0 | 0 | 0 | 0 | 1 |
| $B_2O_3$ | 25 | 18 | 14 | 21 | 25 | 19 | 25 | 15.6 | 18 | 15 | 10 | 10 | 10 | 11 | 30 |
| $Ta_2O_5$ | 0 | 0.5 | 0 | 0 | 0 | 15 | 0 | 30.7 | 0 | 0 | 22 | 35 | 28 | 0 | 0 |
| $Nb_2O_5$ | 0 | 45 | 0 | 0 | 0 | 0 | 0 | 0 | 0 | 0 | 0 | 0 | 0 | 0 | 0 |
| Metal oxides Constitution | | | | | | Presented in Table 2 | | | | | | | | |
| Glass powder | 48 | 36 | 40 | 60 | 50 | 45 | 43 | 60 | 40 | 20 | 38 | 47 | 40 | 45 | 28 |
| Conductive material | | | | | | | | | | | | | | |
| $SnO_2$ | 52 | 64 | 60 | 40 | 50 | 55 | 57 | 40 | 0 | 80 | 62 | 53 | 60 | 55 | 72 |
| Sb-doped $SnO_2$ | 0 | 0 | 0 | 0 | 0 | 0 | 0 | 0 | 60 | 0 | 0 | 0 | 0 | 0 | 0 |
| Average particle size (μm) | | | | | | | | | | | | | | |
| Glass powder | 2.5 | 3.5 | 2.2 | 0.5 | 2.7 | 3.3 | 2.5 | 3.0 | 3.2 | 2.5 | 2.7 | 3.0 | 4.0 | 4.0 | 2.5 |
| Powder of conductive | 0.5 | 1.0 | 0.3 | 1.0 | 0.5 | 0.8 | 0.05 | 1.0 | 1.5 | 0.8 | 1.0 | 0.5 | 0.8 | 1.0 | 0.5 |

TABLE 1-continued

| material Properties | | | | | | | | | | | | | | | |
|---|---|---|---|---|---|---|---|---|---|---|---|---|---|---|
| Resistivity (Ω/□) | 520K | 2M | 200K | 35M | 950K | 3M | 180K | 75M | 18K | 6K | 500K | 15M | 1.6M | 350K | 8K |
| Hot TCR (ppm/°C.) | −140 | −300 | −200 | −150 | −180 | +80 | +220 | −80 | −70 | +150 | +40 | −80 | −60 | +150 | +180 |
| Cold TCR (ppm/°C.) | −120 | −330 | −180 | −140 | −160 | +120 | +200 | −60 | −80 | +130 | +50 | −50 | −40 | +170 | +150 |
| Resistivity drift (%) | +1.0 | +0.7 | +0.8 | +1.0 | +0.3 | −0.5 | −1.0 | +0.5 | +0.1 | +0.2 | −0.3 | +0.4 | −0.3 | +0.2 | +0.3 |

TABLE 2

| | Examples | | | | | | | | | | | | | | | | | | | | | |
|---|---|---|---|---|---|---|---|---|---|---|---|---|---|---|---|---|---|---|---|---|---|---|
| Sample No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Metal Oxides (wt %) | | | | | | | | | | | | | | | | | | | | | | |
| NiO | 1 | 0 | 5 | 0 | 0 | 20 | 0 | 8 | 0.2 | 15 | 0 | 0 | 0 | 0 | 0 | 0 | 0 | 0 | 0 | 0 | 0 | 0 |
| Fe$_2$O$_3$ | 0 | 0 | 0 | 0 | 0 | 0 | 3 | 0 | 0 | 0 | 0 | 0 | 0 | 0 | 0.5 | 15 | 0 | 0 | 0 | 0 | 0 | 0 |
| CuO | 0 | 0.5 | 1.5 | 0 | 0 | 0 | 0 | 0 | 0 | 0 | 0 | 0 | 0 | 0 | 0 | 0 | 10 | 16.5 | 0 | 0 | 0 | 0 |
| MnO | 0 | 0 | 0.5 | 0 | 3 | 0 | 0 | 2 | 0 | 0 | 0 | 0 | 0 | 0 | 0 | 0 | 0 | 0 | 8 | 19 | 0 | 0 |
| MoO$_3$ | 0 | 0 | 0 | 0 | 1 | 0 | 0 | 0 | 0 | 0 | 0 | 0 | 0 | 0 | 0 | 0 | 0 | 0 | 0 | 0 | 10 | 20 |
| WO$_3$ | 0 | 0 | 0 | 2 | 0 | 0 | 0 | 0 | 0 | 0 | 0 | 0 | 0 | 0 | 0 | 0 | 0 | 0 | 0 | 0 | 0 | 0 |
| Bi$_2$O$_3$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| CeO$_2$ | 0 | 0 | 0 | 0 | 0 | 0 | 2 | 0 | 0 | 0 | 0 | 0 | 0 | 0 | 0 | 0 | 0 | 0 | 0 | 0 | 0 | 0 |
| CoO | 0 | 0 | 0 | 2 | 0 | 0 | 0 | 0 | 0 | 0 | 0 | 0 | 0 | 0 | 0 | 0 | 0 | 0 | 0 | 0 | 0 | 0 |
| Cr$_2$O$_3$ | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| Sb$_2$O$_3$ | 0 | 0 | 0 | 0 | 0 | 0 | 0 | 0 | 0 | 0 | 0.5 | 5 | 15 | 11 | 0 | 0 | 0 | 0 | 0 | 0 | 0 | 0 |
| In$_2$O$_3$ | 0 | 0 | 0 | 0 | 0 | 0 | 0.5 | 0 | 0 | 0 | 0 | 0 | 0 | 0 | 0 | 0 | 0 | 0 | 0 | 0 | 0 | 0 |
| SnO$_2$ | 0 | 0 | 0 | 0.5 | 0 | 0 | 0 | 0 | 0 | 0 | 0 | 0 | 0 | 0 | 0 | 0 | 0 | 0 | 0 | 0 | 0 | 0 |

| | Examples | | | | | | | | | | | | | | | | | | | | | |
|---|---|---|---|---|---|---|---|---|---|---|---|---|---|---|---|---|---|---|---|---|---|---|
| Sample No. | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
| Metal Oxides (wt %) | | | | | | | | | | | | | | | | | | | | | | |
| NiO | 0 | 0 | 0 | 0 | 0 | 0 | 0 | 0 | 0 | 0 | 0 | 0 | 0 | 0 | 0.1 | 5 | 10 | 6 | 4 | 5 | 0 | 0 |
| Fe$_2$O$_3$ | 0 | 0 | 0 | 0 | 0 | 0 | 0 | 0 | 0 | 0 | 0 | 0 | 0 | 0 | 0.5 | 1 | 0.5 | 0 | 0 | 0 | 0 | 0 |
| CuO | 0 | 0 | 0 | 0 | 0 | 0 | 0 | 0 | 0 | 0 | 0 | 0 | 0 | 0 | 0.1 | 1 | 0.5 | 0 | 0 | 0 | 0 | 0 |
| MnO | 0 | 0 | 0 | 0 | 0 | 0 | 0 | 0 | 0 | 0 | 0 | 0 | 0 | 0 | 0.1 | 1 | 3 | 0 | 0 | 0 | 0 | 0 |
| MoO$_3$ | 0 | 0 | 0 | 0 | 0 | 0 | 0 | 0 | 0 | 0 | 0 | 0 | 0 | 0 | 0.1 | 1 | 0.5 | 0 | 0 | 0 | 0 | 0 |
| WO$_3$ | 0.5 | 0 | 0 | 0 | 0 | 0 | 0 | 0 | 0 | 0 | 0 | 0 | 0 | 0 | 0.1 | 1 | 0.5 | 0 | 0 | 0 | 15 | 0 |
| Bi$_2$O$_3$ | 0 | 17 | 0 | 0 | 0 | 0 | 0 | 0 | 0 | 0 | 0 | 0 | 0 | 0 | 0.1 | 1 | 0.5 | 0 | 0 | 0 | 0 | 2 |
| CeO$_2$ | 0 | 0 | 0.5 | 18 | 0 | 0 | 0 | 0 | 0 | 0 | 0 | 0 | 0 | 0 | 0.1 | 1 | 0.5 | 0 | 0 | 0 | 0 | 0 |
| CoO | 0 | 0 | 0 | 0 | 8 | 19 | 0 | 0 | 0 | 0 | 0 | 0 | 0 | 0 | 0.1 | 1 | 0.5 | 0 | 0 | 0 | 0 | 0 |
| Cr$_2$O$_3$ | 0 | 0 | 0 | 0 | 0 | 0 | 10 | 20 | 0 | 0 | 0 | 0 | 0 | 0 | 0.1 | 1 | 0.5 | 0 | 0 | 0 | 0 | 0 |
| Sb$_2$O$_3$ | 0 | 0 | 0 | 0 | 0 | 0 | 0 | 0 | 0 | 0 | 0 | 0 | 0 | 0 | 0.1 | 3 | 2 | 0 | 0 | 0 | 0 | 0 |
| In$_2$O$_3$ | 0 | 0 | 0 | 0 | 0 | 0 | 0 | 0 | 0.5 | 5 | 20 | 0 | 0 | 0 | 0.1 | 1 | 0 | 0 | 0 | 0 | 0 | 0 |
| SnO$_2$ | 0 | 0 | 0 | 0 | 0 | 0 | 0 | 0 | 0 | 0 | 0 | 2 | 5 | 20 | 0.1 | 1 | 0 | 0 | 0 | 0 | 0 | 0 |

TABLE 3

| | Examples | | |
|---|---|---|---|
| Sample No. | 1 | 2 | 3 |
| Glass composition (%) | | | |
| SiO$_2$ | 30 | 20 | 30 |
| Al$_2$O$_3$ | 10 | 15 | 0 |
| MgO | 0 | 5 | 5 |
| CaO | 15 | 25 | 15 |
| SrO | 20 | 10 | 15 |
| Li$_2$O | 0 | 0 | 0 |
| Na$_2$O | 0 | 2 | 2 |
| K$_2$O | 0 | 5 | 0 |
| Cs$_2$O | 0 | 0 | 0 |
| PbO | 0 | 0 | 5 |
| ZnO | 5 | 0 | 0 |
| ZrO$_2$ | 0 | 2 | 0 |
| TiO$_2$ | 0 | 1 | 0 |
| B$_2$O$_3$ | 20 | 15 | 28 |
| Ta$_2$O$_5$ | 0 | 0 | 0 |
| Nb$_2$O$_5$ | 0 | 0 | 0 |
| Metal oxides | 0 | 0 | 0 |
| Constitution | | | |
| Glass powder | 10 | 40 | 50 |
| Conductive material | | | |
| SnO$_2$ | 90 | 60 | 50 |
| Sb-doped SnO$_2$ | 0 | 0 | 0 |
| Average particle size (μM) | | | |
| Glass powder | 3.0 | 2.0 | 1.0 |
| Powder of conductive material | 1.0 | 1.0 | 0.5 |
| Properties | | | |
| Resistivity (Ω/□) | 3K | 30K | 700K |
| Hot TCR (ppm/°C.) | −2000 | −1200 | −800 |
| Cold TCR (ppm/°C.) | −2200 | −1250 | −900 |
| Resistivity drift (%) | +150 | −2.0 | +5.0 |

The resistor paste of the present invention can be fired in a non-oxidizing atmosphere such as a nitrogen atmosphere and is capable of forming a highly reliable stabilized resistor on a ceramic substrate, and it is particularly excellent in the resistivity drift properties after storage at a high temperature.

What is claimed is:

1. A ceramic substrate having a circuit pattern formed thereon, wherein the circuit pattern is formed by firing in a non-oxidizing atmosphere, a conductive paste and a resistor paste comprising an inorganic component which consists essentially of
from 20 to 70 wt % of glass powder and from
30 to 80 wt % of a powder selected from the group consisting of $SnO_2$ powder, Sb-doped $SnO_2$ powder and a mixture thereof,
wherein said glass powder consists essentially of
from 12 to 50 wt % of $SiO_2$,
from 0 to 20 wt % of $Al_2O_3$,
from 0 to 40 wt % of $MgO$,
from 0 to 40 wt % of $CaO$,
from 0 to 60 wt % of $SrO$,
from 16 to 60 wt % of $MgO+CaO+SrO$,
from 0 to 10 wt % of $Li_2O+Na_2O+K_2O+Cs_2O$,
from 0 to 10 wt % of $PbO$,
from 0 to 20 wt % of $ZnO$,
from 0 to 10 wt % of $ZrO_2+TiO_2$,
from 8 to 40 wt % of $B_2O_3$,
either from 0.5 to 60 wt % of $Ta_2O_5$, or
from 0.5 to 50 wt % of $Nb_2O_5$, or
from 0.2 to 60 wt % of $Ta_2O_5+Nb_2O_5$, and
from 0.1 to 20 wt % of $Sb_2O_3$.

2. The ceramic substrate according to claim 1, wherein the glass powder consists essentially of
from 12 to 50 wt % of $SiO_2$,
from 0 to 20 wt % of $Al_2O_3$,
from 0 to 40 wt % of $MgO$,
from 0 to 40 wt % of $CaO$,
from 0 to 60 wt % of $SrO$,
from 16 to 60 wt % of $MgO+CaO+SrO$,
from 0 to 10 wt % of $Li_2O+Na_2O+Cs_2O$,
from 0 to 10 wt % of $PbO$,
from 0 to 20 wt % of $ZnO$,
from 0 to 10 wt % of $ZrO_2+TiO_2$,
from 8 to 40 wt % of $B_2O_3$,
either from 0.5 to 50 wt % of $Ta_2O_5$, or
from 0.5 to 45 wt % of $Nb_2O_5$, or
from 0.5 to 50 wt % of $Ta_2O_5+Nb_2O_5$, and
from 1 to 15 wt % of $MnO$ and $Sb_2O_3$.

3. The ceramic substrate according to claim 1, wherein the substrate is made of glass ceramics.

4. The ceramic substrate according to claim 1, wherein the substrate is made of alumina.

* * * * *